US 8,448,607 B2

(12) United States Patent
Giunta

(10) Patent No.: US 8,448,607 B2
(45) Date of Patent: *May 28, 2013

(54) WIRELESS FENCING SYSTEM II

(75) Inventor: Salvatore John Giunta, Stroudsburg, PA (US)

(73) Assignee: PeTrak, LLC, Stroudsburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/959,978

(22) Filed: Dec. 3, 2010

(65) Prior Publication Data

US 2011/0107981 A1    May 12, 2011

Related U.S. Application Data

(63) Continuation of application No. 10/870,397, filed on Jun. 17, 2004, now Pat. No. 7,856,947.

(60) Provisional application No. 60/479,482, filed on Jun. 17, 2003, provisional application No. 60/479,483, filed on Jun. 17, 2003, provisional application No. 60/479,485, filed on Jun. 17, 2003.

(51) Int. Cl.
*A01K 15/04* (2006.01)

(52) U.S. Cl.
USPC ............................................... 119/721

(58) Field of Classification Search
USPC .................... 119/712, 719, 720, 721
See application file for complete search history.

(56) References Cited

U.S. PATENT DOCUMENTS

| 4,898,120 A | 2/1990 | Brose |
| 5,559,498 A | 9/1996 | Westrick et al. |
| 6,232,880 B1 | 5/2001 | Anderson et al. |
| 6,441,778 B1 | 8/2002 | Durst et al. |
| 6,487,992 B1 | 12/2002 | Hollis |
| 6,581,546 B1 | 6/2003 | Dalland et al. |
| 6,878,052 B2 | 4/2005 | Andersson |
| 6,923,146 B2 | 8/2005 | Kobitz et al. |
| 7,059,275 B2 | 6/2006 | Laitinen et al. |
| 2002/0196151 A1 | 12/2002 | Troxler |
| 2005/0000469 A1 | 1/2005 | Giunta et al. |
| 2005/0081797 A1 | 4/2005 | Laitinen et al. |
| 2006/0027185 A1 | 2/2006 | Troxler |

FOREIGN PATENT DOCUMENTS

WO    9801023 A2    1/1998

OTHER PUBLICATIONS

Nguyen, Son T., U.S. Appl. No. 10/870,397 Notice of Allowance Aug. 23, 2010, Publisher: USPTO, Published in: US.
Nguyen, Son T., U.S. Appl. No. 10/870,397 Office Action Mar. 15, 2010, Publisher: USPTO, Published in: US.

(Continued)

*Primary Examiner* — Son T Nguyen
(74) *Attorney, Agent, or Firm* — Kaplan Breyer Schwarz & Ottesen, LLP

(57) ABSTRACT

A wireless fencing system comprises a tetherless leash, a programming fixture, and, optionally, a terminal. The tetherless leash, which is attached to a monitored animal, establishes a "virtual" (i.e., barrier-free) perimeter based on geo-coordinates. The tetherless leash also monitors the position and movement of an animal relative to the virtual perimeter, and delivers warnings, corrections, and praise to the animal in accordance with its programming. The programming fixture serves as a user interface during programming operations, since there are no exposed buttons by which a user can directly program the device. The wireless fencing system does not expand the perimeter in response to perimeter breach of a monitored animal. Rather, a protocol that monitors the animal's speed and location direction of movement relative to the perimeter and/or outbound way points is used.

19 Claims, 11 Drawing Sheets

OTHER PUBLICATIONS

Nguyen, Son T., U.S. Appl. No. 10/870,397 Office Action Jul. 22, 2009, Publisher: USPTO, Published in: US.

Nguyen, Son T., U.S. Appl. No. 10/870,397 Office Action Aug. 8, 2007, Publisher: USPTO, Published in: US.

Nguyen, Son T., U.S. Appl. No. 10/870,397 Restriction Requirement Nov. 28, 2006, Publisher: USPTO, Published in: US.

Nguyen, Son T., U.S. Appl. No. 10/870,397 Restriction Requirement Aug. 4, 2006, Publisher: USPTO, Published in: US.

Nguyen, Son T., U.S. Appl. No. 10/910,863 Examiner's Answer Brief Jun. 24, 2009, Publisher: USPTO, Published in: US.

Nguyen, Son T., U.S. Appl. No. 10/910,863 Restriction Requirement Jan. 19, 2007, Publisher: USPTO, Published in: US.

Nguyen, Son T., U.S. Appl. No. 10/910,863 Office Action May 8, 2008, Publisher: USPTO, Published in: US.

Nguyen, Son T., U.S. Appl. No. 10/910,863 Office Action Aug. 21, 2007, Publisher: USPTO, Published in: US.

Nguyen, Son T., U.S. Appl. No. 10/910,858 Examiner's Answer Brief Oct. 27, 2009, Publisher: USPTO, Published in: US.

Nguyen, Son T., U.S. Appl. No. 10/910,858 Restriction Requirement Oct. 5, 2006, Publisher: USPTO, Published in: US.

Nguyen, Son T., U.S. Appl. No. 10/910,858 Office Action Jan. 18, 2007, Publisher: USPTO, Published in: US.

Nguyen, Son T., U.S. Appl. No. 10/910,858 Office Action Dec. 17, 2008, Publisher: USPTO, Published in: US.

Nguyen, Son T., U.S. Appl. No. 10/910,858 Office Action May 6, 2008, Publisher: USPTO, Published in: US.

Nguyen, Son T., U.S. Appl. No. 10/910,858 Office Action Sep. 5, 2007, Publisher: USPTO, Published in: US.

Stevens et al., U.S. Appl. No. 10/910,863 Decision on Appeal May 4, 2012, Publisher: USPTO, Published in: US.

Calve et al., U.S. Appl. No. 10/910,858 Decision on Appeal Mar. 29, 2012, Publisher: USPTO, Published in: US.

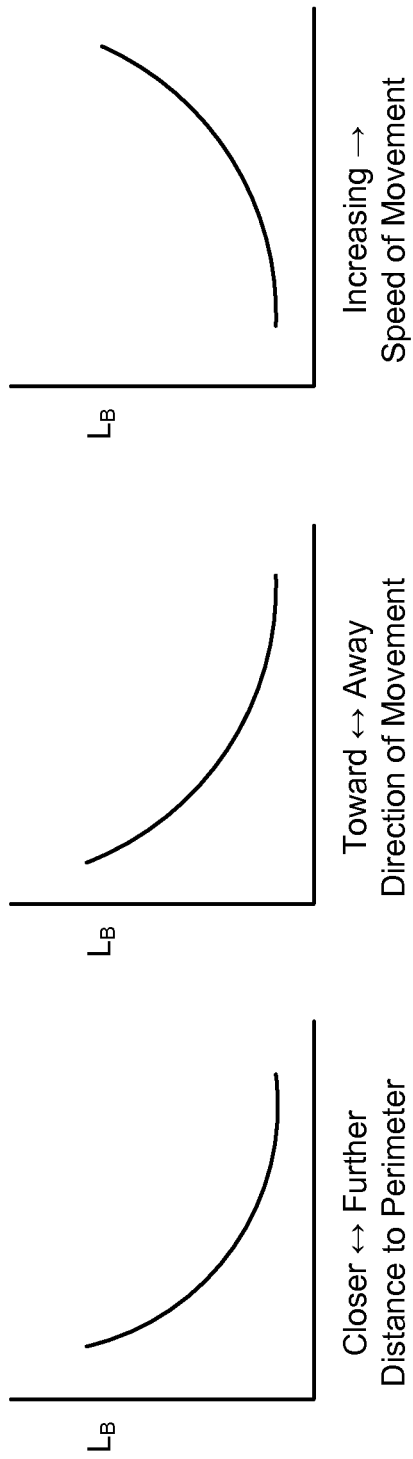

WIRELESS FENCING SYSTEM II

CROSS-REFERENCE TO RELATED APPLICATIONS

This application is a continuation of U.S. patent application Ser. No. 10/870,397, filed Jun. 17, 2004 and now U.S. Pat. No. 7,856,947, which claims priority of and incorporates by reference each of the following applications: Ser. No. 60/479,482, Ser. No. 60/479 483, and Ser. No. 60/479,485, all filed on Jun. 17, 2003.

FIELD OF THE INVENTION

The present invention relates to fencing systems that do not use a physical boundary for containment or exclusion.

BACKGROUND OF THE INVENTION

Fencing systems that use a virtual barrier, rather than a physical barrier, to restrict the location and movement of animals are known in the art. There are two basic types of "virtual" fencing systems.

One type of virtual fencing system employs a buried wire that defines a containment perimeter. The wire radiates a signal that is sensed by a device worn by a monitored animal. As the monitored animal approaches the perimeter, the signal is sensed and the device delivers a correction (e.g., typically sound or an electric shock) to the animal to dissuade it from breaching the perimeter.

The other type of virtual fencing system uses a wireless positioning system, such as GPS, to establish a perimeter and determine an animal's location. An example of such a "wireless" fencing system is disclosed in U.S. Pat. No. 6,581,546 ("the '546 patent").

According to the '546 patent, a control unit that includes a GPS positioning receiver, a means for applying a correction, and suitable control and logic circuitry/software is attached to an animal's collar. In conjunction with the control unit, a user establishes a containment perimeter. The perimeter is defined by positional coordinates, which are obtained from the GPS positioning receiver. In use (after the perimeter is defined), the control unit compares the position of the receiver (i.e., the position of a monitored animal) with the containment perimeter. As the animal approaches the perimeter, as determined by the comparison, a correction is applied. If the animal breaches the perimeter, the control unit expands the perimeter in a further attempt at containment. The system attempts to redirect the movement of the animal toward the original containment zone using additional corrections as necessary. Further perimeter breaches are addressed by continued perimeter expansion. If the animal changes direction toward the original containment zone, the expanded perimeter is then contracted behind the animal.

One benefit of a wireless fencing system, relative to buried-wire systems, is that the wireless fencing system has the ability to dynamically change the perimeter in order to regain control of an animal after a breach. Once breach occurs in a buried-wire system, the ability to control the animal is lost. A second benefit of a wireless fencing system over a buried-wire system is that there is no disincentive in a wireless fencing system to re-cross a breached perimeter. In particular, if an animal attempts to return to the original containment zone in a buried-wire system, it will be corrected as it nears the wire. This provides a disincentive to return to the containment zone. In contrast, in a wireless system, the perimeter can be reestablished behind a returning animal so that he will not be corrected or otherwise dissuaded from returning to the original confinement zone.

There are, however, some drawbacks to wireless fencing systems, such as the one described in the '546 patent. One drawback is that when an original perimeter is expanded in response to a breach, a "free" zone in which the animal is permitted to roam is established between the original perimeter and the expanded one. This might place an animal in jeopardy by allowing it to reach dangerous areas that it could not otherwise access from the original confinement zone.

A second drawback of some wireless fencing systems is that they implicitly rely on untested assumptions about the animal's return path. In particular, some wireless fencing system create a sequence of small confinement zones (rather than a simple expanded perimeter) to herd to the original confinement zone. This sequence of small zones is assumed to provide a safe return path based solely on the fact that the animal traversed that route on its outbound journey. But that path might not be safe and it might not be the shortest route back to the original containment zone.

A third drawback of some wireless fencing systems is that the programming interface (e.g., a button, etc.) is located on the control unit that is attached to the animal's collar. To the extent that an animal that is wearing a control unit is exposed to rain, mud or free-standing water, as might occur when the animal is outside in inclement weather, the internals of the control unit can malfunction, thereby shortening the life of the control unit.

A need exists, therefore, for a wireless fencing system that avoids one or more of the disadvantages of the prior art.

SUMMARY

The present invention is a wireless fencing system that avoids some of the costs and disadvantages of the prior art.

A wireless fencing system in accordance with the illustrative embodiment comprises a tetherless leash, a programming fixture, and, optionally, a terminal. The tetherless leash is a portable control device that is typically attached to the collar of an animal. The tetherless leash is capable of establishing a "virtual" (i.e., barrier-free) perimeter (e.g., circular, polygonal, etc.) based on geo-coordinates. The tetherless leash is also capable of monitoring the position and movement of an animal relative to the perimeter in an attempt to keep the animal on the desired side of the perimeter. The tetherless leash issues warnings, corrections, and praise, in accordance with its programming, in an attempt to control the behavior of a monitored animal.

Unlike some prior-art systems, a wireless fencing system in accordance with the present invention does not expand the perimeter in response to perimeter breach of a monitored animal. Rather, a protocol that monitors the animal's speed, location, and direction of movement relative to the perimeter and/or outbound way points is used. This protocol avoids the problems that can arise, as described in the Background section, when a perimeter is expanded in an attempt to maintain control of an animal that has breached its confinement.

A programming fixture is used in conjunction with the tetherless leash during programming operations. The fixture serves as a user interface. The programming fixture is required since, unlike the prior art, there are no exposed buttons on the tetherless leash. Although this requires the use of an additional device to program the tetherless leash, it renders the tetherless leash less susceptible to malfunction due to environmental conditions (e.g., water, etc.) than most prior-art wireless-fencing control devices.

Furthermore, the programming fixture covers stimulus electrodes (used to deliver a "correction" to a monitored animal) during programming operations so that a user cannot be inadvertently shocked.

The optional terminal is used to provide a graphical display of the perimeter to ensure that it has been properly established (e.g., correct location, etc.). Additionally, once a perimeter has been defined and stored in the tetherless leash, a copy of the programming can be downloaded to the terminal as a back-up. Also, programming information can input directly into the terminal and then downloaded to the tetherless leash.

BRIEF DESCRIPTION OF THE DRAWINGS

FIG. 7A depicts a relation showing likelihood of perimeter breach as a function of distance from the perimeter.

FIG. 7B depicts a relation showing likelihood of perimeter breach as a function of direction of movement of a monitored animal relative to the perimeter.

FIG. 7C depicts a relation showing likelihood of perimeter breach as a function of the speed of movement of a monitored animal.

DETAILED DESCRIPTION

The illustrative embodiment of the present invention is a wireless fencing system. A common use for the wireless fencing system described herein is to confine an animal within a region and/or exclude an animal from a region. As used hereinafter, the term "confine" means "confine and/or exclude" unless otherwise indicated.

For the purposes of this specification, the term "confinement zone" refers to the region in which the animal is confined (e.g., a pet owner's backyard, etc.) and the term "exclusion zone" refers to the region from which the animal is excluded (e.g., a garden, a pool, etc.). As used hereinafter, the term "confinement zone" means "confinement zone and/or exclusion zone" unless otherwise indicated. For the purposes of this specification, the term "animal" and its inflected forms mean pets, farm animals, livestock, and homo sapiens. Other terms are defined through this specification.

Overview

A brief overview of a wireless fencing system in accordance with the illustrative embodiment of the present invention follows to provide context for the description that follows. The elements and concepts presented in this overview, as well as many others, will be described in further detail later in this specification.

Figure 1:
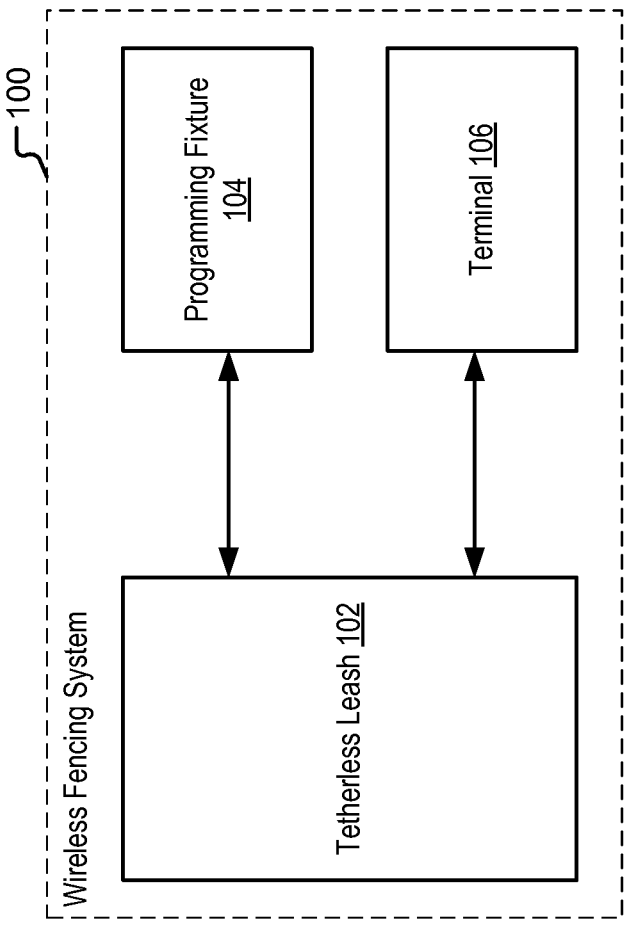
FIG. 1 depicts wireless fencing system 100 in accordance with the illustrative embodiment of the present invention.

As depicted in FIG. 1, wireless fencing system 100 includes tetherless leash 102, programming fixture 104, and terminal 106. These three elements are not required for all modes of use of the system. For example, during routine monitoring operations, only tetherless leash 102 is used. On the other hand, when system 100 is being programmed, tetherless leash 102, programming fixture 104, and, optionally, terminal 106 are used.

Tetherless leash 102, which is the heart of wireless fencing system 100, is a portable control unit that is capable of performing many programming and monitoring functions. A partial list of these functions includes an ability to:

1. Establish a perimeter, thereby defining a confinement zone.
2. Monitor the movement of an animal, noting attributes of its movement such as position, speed, and direction of movement.
3. Compare the location of a monitored animal to the perimeter.
4. Estimate the likelihood that a monitored animal will breach the perimeter as a function of the animal's position, speed, and direction of movement.
5. Determine whether or not a monitored animal has breached a perimeter.
6. Determine, for a monitored animal that has not breached the perimeter, whether or not to apply a stimulus based on the estimated likelihood of breach or proximity to the perimeter.
7. Determine, for a monitored animal that has breached the perimeter, whether or not to apply a stimulus based on attributes of its movement.
8. Determine the type of stimulus to apply and its severity.
9. Deliver the stimulus.

In the illustrative embodiment, tetherless leash 102 is contained within housing 208, which is attached to collar 210 having a clasp 212. See FIG. 2. When used with a pet or livestock, collar 210 is typically placed around the neck of an animal. When tetherless leash 102 is used with a human, it can, for example, be attached to a wrist or ankle strap. It will be clear to those skilled in the art how to attach the tetherless leash to an animal.

To perform the functions listed above, as well as other functions, tetherless leash 102 includes a positioning system receiver, a suitably-programmed processor, memory, an input device (e.g., programming switch, etc.), and a stimulator, among other circuits.

The positioning system receiver (e.g., a GPS receiver, a Loran-C receiver, etc.) receives radiated signals and, using those signals, calculates its location (and therefore the location of the animal to which tetherless leash 102 is attached) in known fashion. In the illustrative embodiment, the location is calculated as a pair of geo-coordinates (i.e., longitude and latitude). The geo-coordinates are required for both programming (e.g., establishing a perimeter, etc.) and monitoring operations.

With regard to monitoring operations (some of which are listed above) the processor determines, based on location information, whether or not a monitored animal has breached a "virtual" perimeter that was established by the tetherless leash. If perimeter breach has not occurred, the processor follows a first set of protocols, in accordance with its programming, to determine if breach is likely and, if so, to dissuade the animal from breach. If the perimeter has been breached, the processor follows a second set of protocols that are intended to regain control of the animal and return it to the confinement zone.

To dissuade an animal from breach, or to prompt it to return to a confinement zone after breach occurs, the tetherless leash is capable of applying a stimulus to a monitored animal. The processor determines whether stimulus should be applied to the animal and, if so, determines the type and severity of the stimulus.

Responsive to a command initiated by the processor, the stimulator provides a stimulus (e.g., a warning or a correction) of the indicated severity. To the extent that the animal is exhibiting desirable behavior, such as movement toward a previously-breached confinement zone, the processor is also capable of promoting continued desirable behavior by initiating a reward (e.g., playback of the master's voice saying "good dog," etc.).

Unlike some prior art wireless fencing systems, tetherless leash 102 has no exposed switches or buttons as are often used for programming (e.g., establishing a perimeter, etc.). In fact, in the illustrative embodiment, housing 208 is waterproof, such that the circuitry of the tetherless leash is sealed-off from the ambient environment. This reduces the exposure of circuitry to moisture, thereby extending the useful life of tetherless leash 102.

Since there are no exposed switches on tetherless leash 102, the input device (e.g., programming switch) must be indirectly accessed for programming and other functions. This is accomplished using programming fixture 104, which serves as a user interface for programming tetherless leash 102. As described in further detail later in this specification, in the illustrative embodiment, the input device is magnetically actuated via the programming fixture.

The specification now continues with a description of the operation (programming and monitoring) of wireless fencing system 100, which is followed by a detailed description of the structure of the physical elements that compose the illustrative embodiment of the wireless fencing system.

Operation—Programming

In an initial, pre-programmed state, positioning circuitry within tetherless leash 102 is powered down while the processor scans the input device (e.g., programming switch, etc.). All functions of the tetherless leash are otherwise suppressed. To begin programming, tetherless leash is coupled to programming fixture 104 (see, FIGS. 12A, 12B and the accompanying description). When the processor detects that the input device (e.g., a programming switch, etc.) has changed state (e.g., closed, etc.), initialization occurs wherein the positioning-system receiver is powered up and ephemeris and almanac data is acquired.

After initialization, a first positional fix is obtained from the positioning-system receiver and is stored. The positional fix comprises a pair of longitudinal and latitudinal coordinates.

Depending upon the desired shape of the confinement/exclusion zone perimeter, this first positional fix will be interpreted as either (1) the geometric center of a circular perimeter, or (2) a first vertex of a polygonal perimeter. In the illustrative embodiment, the shape of the perimeter (i.e., circular vs. polygonal) is dictated by the user's initial choice of model; one model of the tetherless leash generates a circular perimeter while a second model generates a polygonal perimeter. In some alternative embodiments, a single model is capable of generating both perimeter shapes, wherein the desired shape is selected by the push of a button (or a sequence of button pushes).

Figure 3:
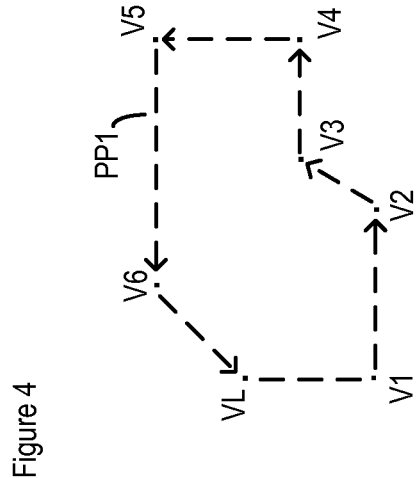
FIG. 3 depicts tetherless leash 102 establishing a circular perimeter.

FIG. 3 depicts tetherless leash 102 establishing a circular perimeter, wherein positional coordinates (e.g., LONG1, LAT1, etc.) of tetherless leash 102 define the geometric center of perimeter CP1. The initial perimeter CP1 that is established by tetherless leash 102 has a factory-set or user-defined radius R. Each subsequent programming-switch closure (as actuated by depressing a button, etc.) increments the radius of the perimeter by some factory-set or user-defined amount I. For example, a second programming-switch closure defines a perimeter CP2 that has a radius R+I, and a third programming-switch closure defines a perimeter CP3 with a radius R+2I, and so forth. These subsequent perimeters are replacement perimeters; that is, a newly-established perimeter replaces an earlier perimeter. Tetherless leash 102 acknowledges the request to increment with a "beep" or other indication. The tetherless lease will interpret the cessation of programming-switch closures, over a minimum period of time (e.g., 10 seconds, etc.), as the end of the programming session.

Figure 4:
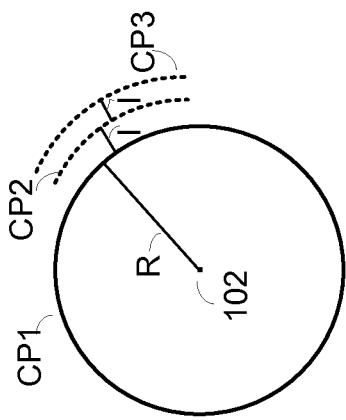
FIG. 4 depicts tetherless leash 102 establishing a polygonal perimeter.

FIG. 4 depicts polygonal perimeter PP1 being established by tetherless leash 102. To establish the perimeter, a user manually places flags or other physical markers at each vertex of the desired perimeter. Walking the perimeter with tetherless leash 102 and programming fixture 104, which are appropriately coupled to one another as described later in this specification, the user obtains a first positional fix at first vertex V1 of perimeter PP1. The first vertex has positional coordinates (e.g., LONG1, LAT1, etc.). The user then moves to second vertex V2 and activates the programming switch to obtain a second set of positional coordinates (e.g., LONG2, LAT2, etc.). Each time the programming switch is closed (and held in a closed position for some minimum period of time), a positional fix of tetherless leash 102 is obtained and stored as a vertex of perimeter PP1. Tetherless leash 102 acknowledges, via a "beep" or other indication, that a positional fix has been obtained.

In the illustrative embodiment of tetherless leash 102, it is not necessary for a user that is walking the perimeter to walk in a straight line from vertex to vertex. But the positional order of the vertices should be maintained. That is, the user should walk from V1 to V2 and so forth when establishing the perimeter.

As described above, by moving from location to location and activating the programming switch, perimeter PP1 is defined. To complete perimeter PP1, the programming switch is activated and held for a relatively longer period of time than is required to obtain a positional fix. This is recognized by tetherless leash as the end of the programming session. Tetherless leash 102 acknowledges the request to end the session with a unique indication (e.g., additional "beeps," etc.).

Perimeter PP1 can be completed either by returning to starting vertex V1 or by ending at a last vertex VL, which is not coincident with the first vertex. In the latter case, tetherless leash 102 "automatically" closes the final portion of the polygonal perimeter between last vertex VL and first vertex V1.

In accordance with the illustrative embodiment, when the final portion of the perimeter is closed automatically as described above, that portion of the perimeter is inactive. This is advantageous, for example, if the final portion of the perimeter is closed through the structure of a dwelling. This will avoid problems that might arise if a monitored animal runs toward the dwelling to enter it and triggers a warning or correction, as would occur if that portion of the perimeter were active.

Perimeters CP1 and PP1 demarcate confinement zones; the illustrative embodiment of the present invention can also be used to establish exclusion zones, which are typically, but not necessarily, established within a confinement zone.

Figure 5:
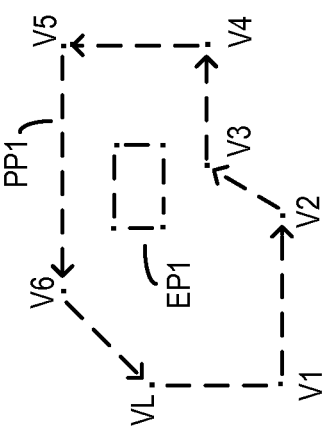
FIG. 5 depicts tetherless leash 102 establishing an exclusion zone within a confinement zone.

FIG. 5 depicts tetherless leash 102 establishing a polygonal exclusion zone, as defined by perimeter EP1, within a polygonal confinement zone, as defined by PP1. In the illustrative embodiment, to establish both a confinement zone and an exclusion zone, two programming switches are incorporated into tetherless leash 102 and programming fixture 104. One button ("the primary button") controls whether the perimeter defines a confinement zone or an exclusion zone, and the other button ("the secondary button") is used to obtain positional fixes. The exclusion zone, as defined by perimeter EP1, is established in the same manner as the confinement zone, as defined by perimeter PP1.

In the illustrative embodiment, a confinement zone must be established before an exclusion zone can be established. As a consequence, when programming begins, tetherless leash 102 is set to define a confinement zone. After the perimeter for the confinement zone is established, such as in the manner described above for perimeter PP1, each time the secondary button is actuated, an additional positional fix is obtained and stored as a vertex of a perimeter (i.e., perimeter EP1) that defines an exclusion zone. Once the perimeter for a particular exclusion zone is closed, in the manner described above, additional exclusion zones can be defined. Once the last exclusion zone is defined, the primary button is momentarily actuated to signal the end of the programming session.

In the illustrative embodiment, a polygonal exclusion zone is established in a polygonal confinement zone. It will be understood that in various alternative embodiments of wireless fencing system 100, circular exclusion zones can be established within circular confinement zones, circular exclusion zones can be established within polygonal confinement zones, and polygonal exclusion zones can be established within circular confinement zones. Furthermore, while certain protocols were described for terminating certain functions and enabling certain other functions of tetherless leash 102 (e.g., pushing and holding one or the other of two buttons for a length of time, etc.), it will be understood that a variety of other protocols are available for the same purposes. It will be clear to those skilled in the art, after reading this disclosure, how to implement other protocols for enabling and terminating the multiple functions of tetherless leash 102.

In accordance with the illustrative embodiment, tetherless leash 102 can be used away from its "home zone" on a temporary basis. In the illustrative embodiment, this is accomplished by deactivating the tetherless leash using an inhibiting device. In accordance with the illustrative embodiment, the inhibiting device is a magnet. The magnet is brought into contact with tetherless leash 102 to actuate the magnetically-actuated input device situated therein. The magnet is kept in position for an extended period of time. The processor is suitably programmed to recognize this extended actuation period as an intent to inhibit or disable normal monitoring operations of the tetherless leash. The tetherless leash can then breach the home zone perimeter. A similar period of extended contact with the inhibiting device reactivates tetherless leash 102. When reactivated after having been deactivated in the manner described, the tetherless leash will obtain a positional fix. If the positional fix places tetherless leash 102 well outside of its home zone, it defaults to a "park" zone operation in which it:

sets its current location as the geometric center of a new, circular confinement zone of some predetermined radius; or is ready to accept programming for a polygonal confinement zone.

When tetherless leash 102 returns to its home zone, it resumes normal operation and the temporary park zone program is cleared. This feature enables an owner to bring a pet to a park, for example, and establish a temporary confinement zone at that location.

Figure 6:
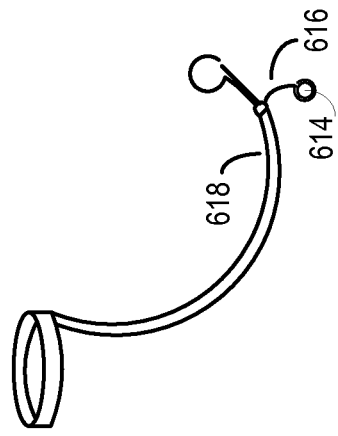
FIG. 6 depicts an inhibiting device for inhibiting monitoring operations of tetherless leash 102.

In embodiments in which the monitored animal is a dog, the inhibiting device, which is depicted in FIG. 6 as magnet 614, can be secured to the dog's leash 618 by flexible, corrosion-resistant cable 616.

Operation—Monitoring

Once the appropriate containment/exclusion zone perimeter(s) are set, and the animal is trained (at least in theory) to respect the perimeter(s), normal monitoring operations can begin. The positioning system receiver obtains periodic or sporadic positional fixes, which the processor uses to determine what action to take (e.g., warning, correction, praise), if any, with respect to a monitored animal.

Once a positional fix is obtained, there is no reason to take another positional fix—and good reason not to—unless the monitored animal changes its location. In particular, obtaining a positional fix is very power intensive. As a consequence, in order to conserve power, the tetherless leash enters a sleep mode whenever a monitored animal is motionless for some predefined time period. A motion detector, resident in the tetherless leash, awakens the positioning system receiver if motion, consistent with walking or running, is detected. In the illustrative embodiment, the motion detector is capable of distinguishing between locomotion and rolling over, stretching, or head/body shaking (wringing), which dogs often do after a nap. Only locomotion requires a subsequent positional fix, since the other motions do not involve any significant change in location. Furthermore, the motion sensor is capable of distinguishing between walking and running. This presents another opportunity for power conservation, since positional updates will often be required less frequently for an animal that is walking as compared to an animal that is running.

Based on the positional fix, the processor determines whether a monitored animal has breached a perimeter. Monitoring protocols are classified into one of two groups as a function of whether or not the animal has breached a perimeter. This description proceeds with the protocols that apply before perimeter breach occurs.

In some embodiments, a stimulus is administered when the animal comes within a predefined distance to the perimeter—a stimulus zone. Once within the stimulus zone, the severity of the stimulus is based on a measure of the likelihood that the perimeter will be breached.

The likelihood of breach is a function of the speed and direction ("vector") of movement of the animal and the distance of the animal to the perimeter. This relationship is illustrated in FIGS. 7A through 7C.

FIG. 7A indicates that the likelihood of breach, $L_B$, increases with decreasing distance to the perimeter. While this is generally true, it is not always true. For example, consider a scenario in which an animal is near a perimeter, but is simply loitering—moving parallel to the perimeter and at slow speed. Contrast that scenario with one in which the animal is somewhat further from the perimeter, but is heading directly toward it at a high rate of speed. The latter scenario will have the higher likelihood of breach.

FIG. 7B indicates the likelihood of breach, $L_B$, for an animal that is relatively close to the perimeter. FIG. 7B shows that the likelihood of breach increases as an animal heads more directly toward the perimeter. It is noteworthy that FIG. 7B is a strong function of the proximity of the animal to the perimeter. That is, to the extent that the animal is far from the perimeter, there will be little change in the likelihood of breach as a function of the animal's direction of movement. Furthermore, FIG. 7B is a function of the speed of movement, as well. Consider a scenario in which an animal (at a given distance from a perimeter) is moving at a high rate of speed toward the perimeter at an angle of about 45°. Contrast that scenario with one in which the animal is at the same distance from the perimeter, and headed directly toward it, but at a very slow rate of speed. The former scenario will have a higher likelihood of breach.

FIG. 7C indicates the likelihood of breach, $L_B$, for an animal that is relatively close to the perimeter and moving toward the perimeter. FIG. 7C shows that, for the stated conditions, the likelihood of breach increases as speed increases. This relation is a strong function of the distance to the perimeter and the direction of movement.

Using the relations described above, those skilled in the art will be able to develop expressions for likelihood of breach as a function of distance to the perimeter, direction of movement, and speed of movement.

In some other embodiments, there is no predefined "stimulus zone;" rather, the application of a stimulus is solely a function of the estimated likelihood of a perimeter breach. The likelihood of breach is again a function of the vector of movement of animal and its distance to the perimeter.

To summarize, based on positional estimates, the processor determines whether or not the monitored animal has breached the perimeter. If perimeter breach has not occurred, then the processor determines:

1. whether the monitored animal is within a predefined stimulus zone (e.g., within 6 feet of the perimeter, etc.); and/or
2. an estimate of the likelihood of whether the monitored animal will violate the perimeter, based on the animal's vector of movement and proximity to the perimeter.

In accordance with its programming, the processor determines whether or not a stimulus will be applied, and, if it is to be applied, the type and severity of the stimulus.

This latter protocol (i.e., no predefined stimulus zone) is preferable to one that relies on a stimulus zone as a threshold for applying a stimulus. For example, consider a first location that is 12 feet from a perimeter. If a monitored animal lies down in the shade of a tree at the first location, then a decision might be made not to apply any stimulus, since there is a very low likelihood that the animal will breach the perimeter (based on that behavior). If, at the first location, the animal is moving toward the perimeter at a slow walk, then a mild stimulus (e.g., a low-level audible alert, etc.) might be appropriate. And if, at the first location, the animal is moving toward the perimeter at high speed, the likelihood of perimeter breach is very high, and a severe stimulus is appropriate.

If a stimulus zone is set at 12 feet from the perimeter, a stimulus would be applied, probably unnecessarily, to the animal that is lying in the shade. In the case of the high-speed approach, it would have been advantageous for the stimulus to be applied well before the animal reached the stimulus zone. As a consequence, basing stimulus decisions on a likelihood of breach, as a function of vector of movement and position, without regard to the monitored animal's presence within a stimulus zone, is often a more effective approach to containment.

This specification continues with a description of a protocol that is applied after a monitored animal breaches a perimeter.

Unlike prior-art wireless fencing systems, and in accordance with the illustrative embodiment, tetherless leash 102 does not expand the perimeter in an attempt to regain control of a monitored animal after perimeter breach occurs. Rather, after breach, tetherless leash 102 will deliver warnings, correction, or praise as a function of the animal's movements.

More particularly, once breach occurs, the tetherless leash will correct the monitored animal until (1) the animal stops moving; (2) stops moving away from the containment zone; or (3) a predefined time limit is exceeded. This protocol is followed irrespective of location; that is, there is no attempt to define a new or expanded perimeter.

If the animal stops moving, correction stops immediately. If the animal fails to move within a predefined period of time the tetherless leash will deliver a warning (i.e., audible alert), but no correction (i.e., electric shock).

Once the animal begins moving, the tetherless leash will continue to monitor the animal's vector of movement with the positioning system receiver and motion sensor(s). If the animal moves away from the confinement zone, it will receive a warning and then a correction. If the animal moves tangentially it will receive a warning after a predefined period of time to discourage this type of movement, with one important exception.

Waypoints of the animal's outbound path after perimeter breach are stored. If the animal tries to return along that path, even if it is tangential or even outbound at some point, it will be allowed, since this path might represent the only practical return path.

The tetherless leash allows for some deviation (e.g., plus or minus 10 feet, etc.) from the outbound path as represented by the stored waypoints. This can be accomplished, for example, by repeatedly determining the distance between the closest way point and the animal, and comparing that distance to a threshold distance.

If an animal reverses direction for brief periods of time and at low velocity, it will be allowed to continue without intervention, since this movement might be necessary to avoid obstacles and obstructions.

If the animal continues on along an outbound path, correction continues for a predefined time period, at which point the correction stops. The correction then cycles on and off, until the animal stops moving or stops moving away from the containment zone.

This protocol avoids "herding" a monitored animal toward the confinement zone using corrections because it is unclear how a motionless animal will respond to a correction that is applied outside the confinement zone where it was trained and has visual cues.

In the illustrative embodiment, when the tetherless leash detects movement in the desired direction toward the containment zone or movement that retraces the outbound path in reverse, praise is intermittently delivered, such as by broadcasting a synthetic or recorded verbal response (i.e., "good dog" etc.).

Figure 8:
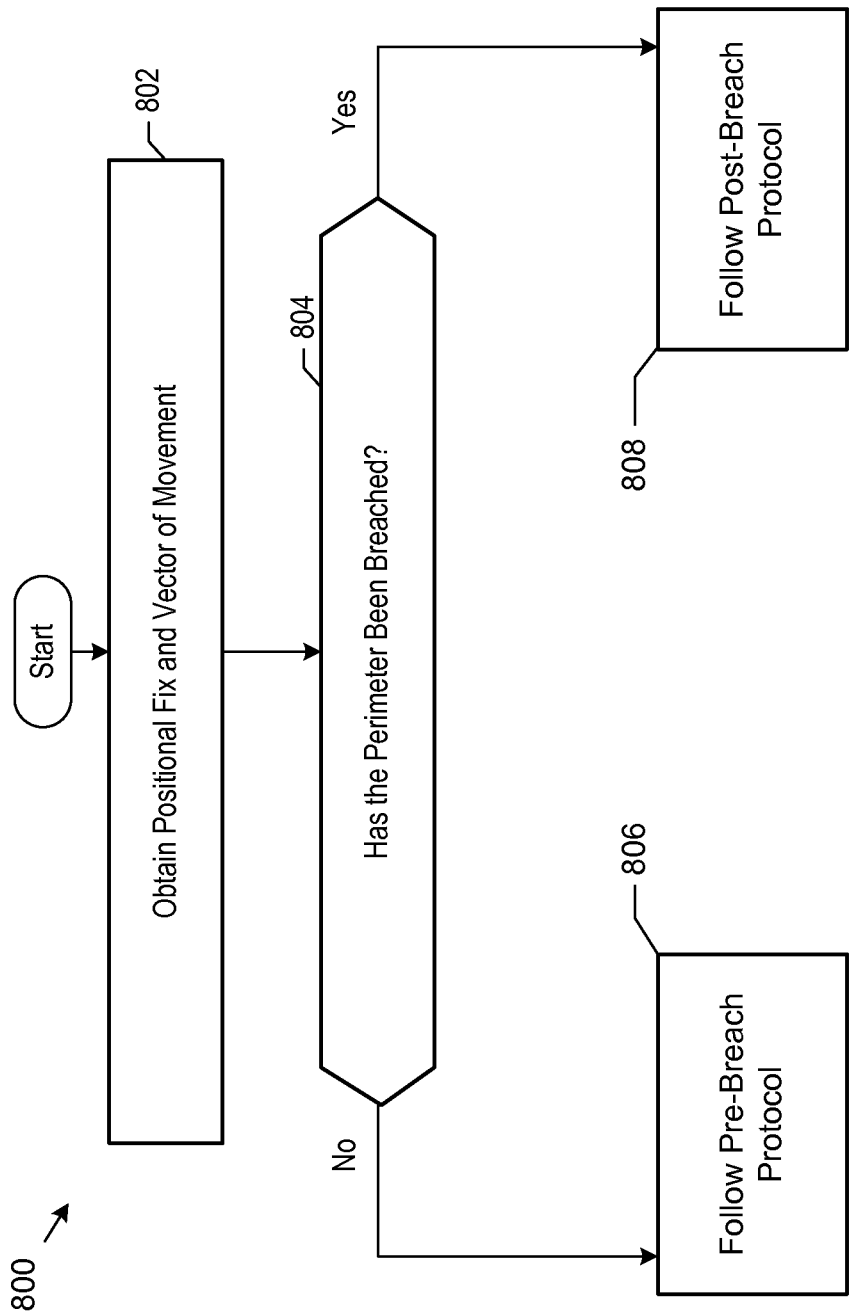
FIG. 8 depicts method 800 for monitoring an animal in accordance with the illustrative embodiment of the present invention.
Figure 9:
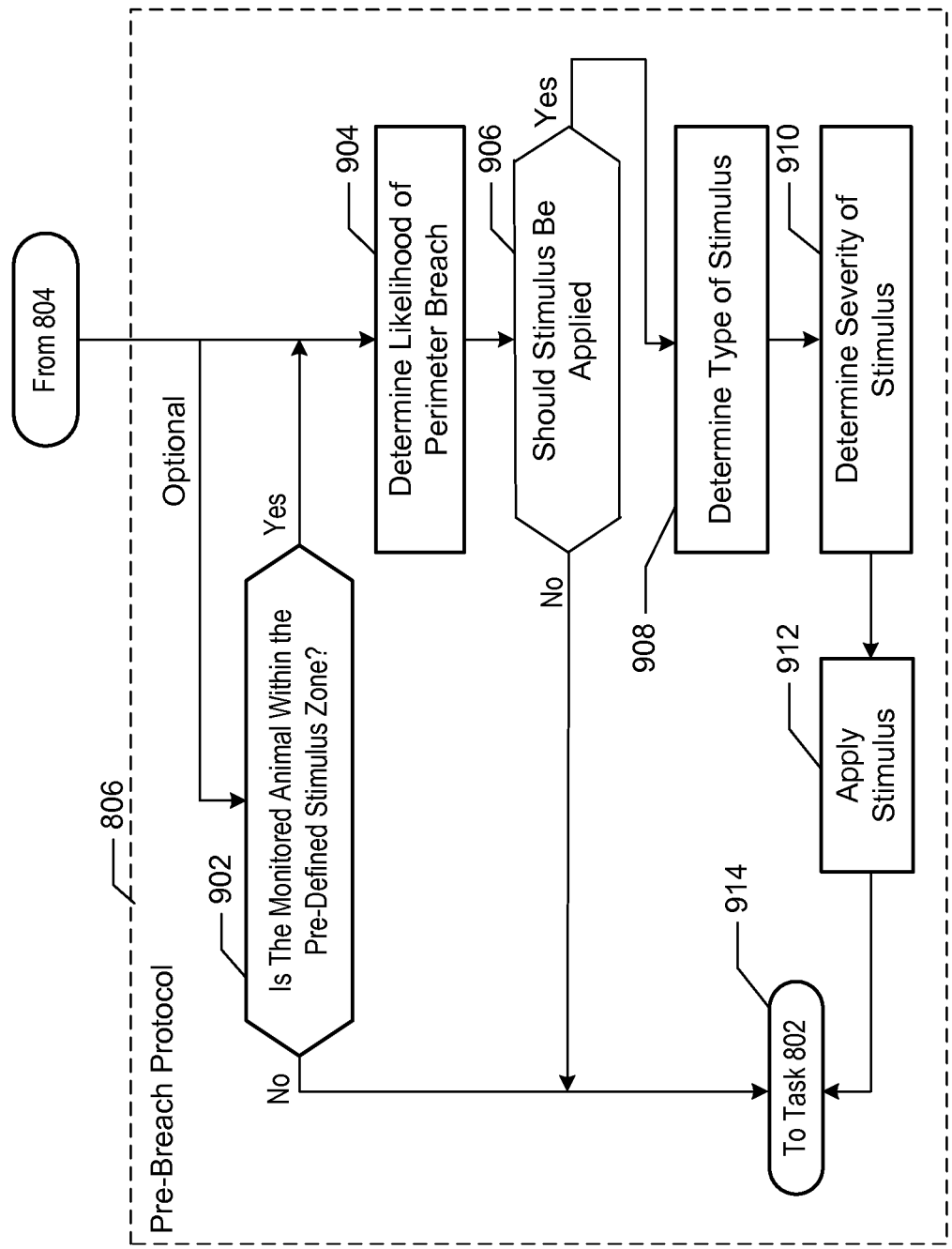
FIG. 9 depicts sub-operations of operation 806 of method 800.
Figure 10A:
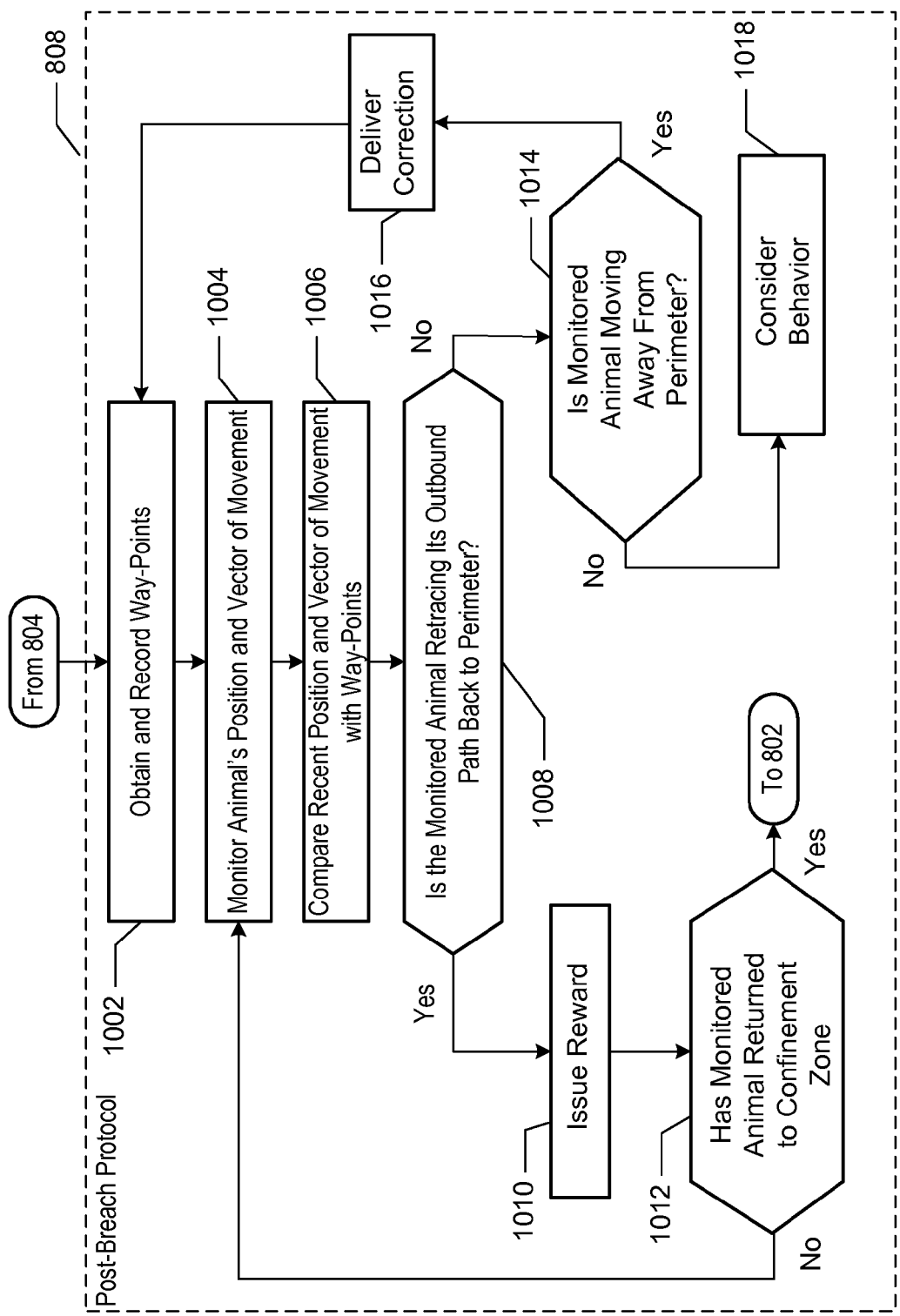
FIG. 10A depicts sub-operations of operation 808 of method 800.
Figure 10B:
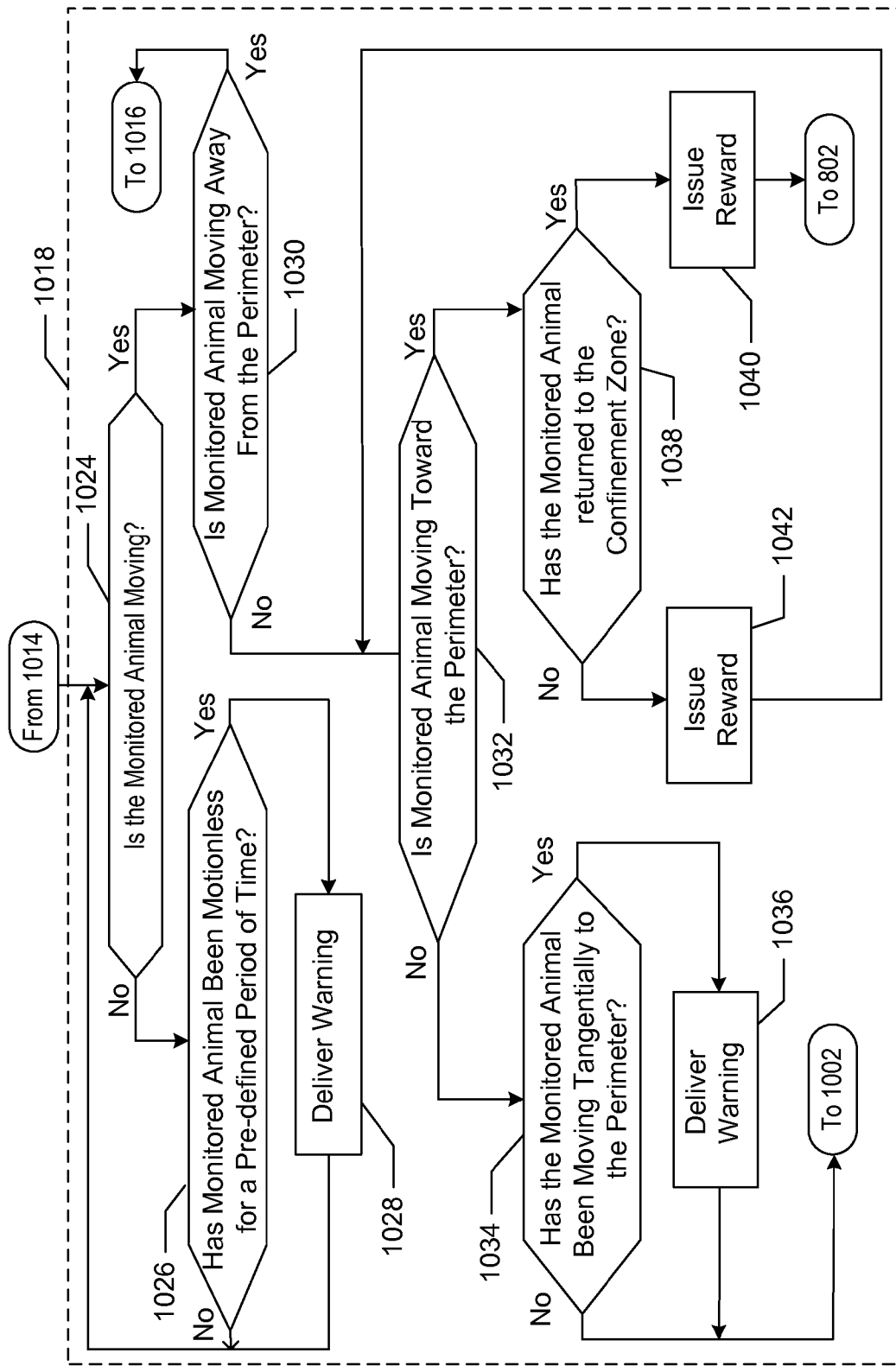
FIG. 10B depicts sub-operations of sub-operation 1018 of FIG. 10A.

FIG. 8 depicts method 800 for monitoring an animal in accordance with the illustrative embodiment of the present invention. Method 800 incorporates the protocols for pre- and post-breach monitoring described above. FIG. 9 depicts method 806 for pre-breach monitoring, in accordance with the protocols described above. And FIGS. 10A and 10B depict method 808 for post-breach monitoring, in accordance with the protocols described above.

This specification proceeds with a description of structural components of wireless fencing system 100.

Tetherless Leash 102

Figure 11:
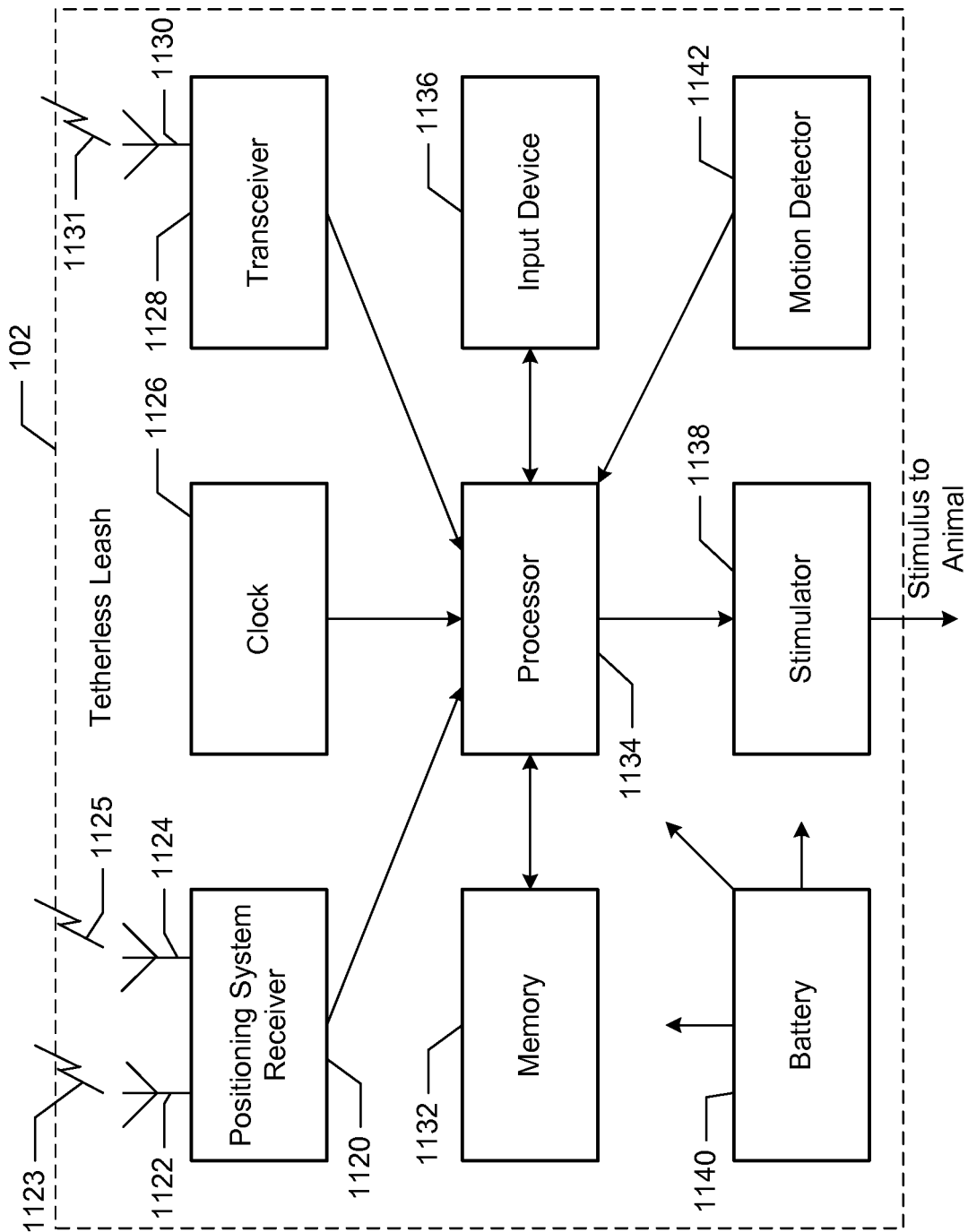
FIG. 11 depicts a block diagram of the salient components of tetherless leash 102 in accordance with the present invention.

FIG. 11 depicts a block diagram of the salient components of tetherless leash 102 in accordance with the illustrative embodiment of the present invention. The tetherless leash comprises: positioning system receiver 1120, clock 1126, transceiver 1128, memory 1132, processor 1134, input device 1136, stimulator 1138, battery 1140, and motion sensor(s) 1142, interrelated as shown.

Positioning system receiver 1120 includes antenna 1122 for receiving electromagnetic signals 1123 from an external transmitter (not shown) and appropriate circuitry for determining its location, in well-known fashion, from those signals.

In the illustrative embodiment, positioning system receiver 1120 comprises a Global Positioning System (which is also known as "GPS") receiver and a Wide Area Augmentation System (also known as "WAAS") receiver. Together, these receivers can determine the location of tetherless leash 102 to within about 2 meters, in well-known fashion. In some alternative embodiments of the present invention, positioning system receiver 1120 comprises a terrestrial radio navigation receiver, such as a Loran-C receiver. In any case, it will be clear to those skilled in the art how to make and use positioning system receiver 1120.

In the illustrative embodiment, positioning system receiver 1120 also includes antenna 1124 for receiving DGPS correction signals 1125 and further includes appropriate circuitry for using these signals to improve the accuracy of GPS location estimation in known fashion.

Clock 1126 is a timepiece with a calendar function that tracks the current time and date and provides that information to processor 1134 in well-known fashion. Clock 1126 initially acquires time and date information from positioning system receiver 1120 in well-known fashion.

Transceiver 1128 is a Bluetooth transceiver that is capable of receiving and transmitting information 1131 via antenna 1130. For example, transceiver 1128 is able to receive voice recordings (i.e., "audio clips") for storage in memory 1132 and is able to receive/send confinement zone definitions from/to a second (i.e., spare) tetherless leash or other device capable of storing those definitions. It will be clear to those skilled in the art, after reading this specification, how to make and use transceiver 1128.

Memory 1132 is a non-volatile memory. The memory stores data and instructions required by processor 1134 as well as the results of processing operations.

Processor 1134 is a general-purpose processor that is capable of:
  executing instructions stored in memory 1132;
  reading data from and writing data to memory 1132;
  reading time and date information from and updating time and date information to clock 1126;
  receiving user inputs from input device 1136;
  receiving geo-coordinates from positioning system receiver 1120;
  establishing a "virtual" perimeter to define a containment zone;
  receiving information from transceiver 1128;
  controlling stimulator 1138; and
  executing methods 800, 806, and 808, as depicted in FIGS. 8 through 10B, which incorporate the protocols that were previously described.

In some alternative embodiments of the present invention, processor 1134 is a special-purpose processor. In either case, it will be clear to those skilled in the art, after reading this disclosure, how to make and use processor 1134.

Input device 1136 enables the user to input programming commands to processor 1134. The programming commands include commands to establish the confinement and exclusion zones and to inhibit and activate stimulator 1138. In some embodiments, input device 1136 is magnetically actuated or otherwise affected by a magnetic field. Examples of devices that are magnetically actuated or otherwise magnetically affected and that are suitable for use as input device 1136 include, without limitation, a magnetic reed switch and a Hall Effect sensor.

Figure 2:
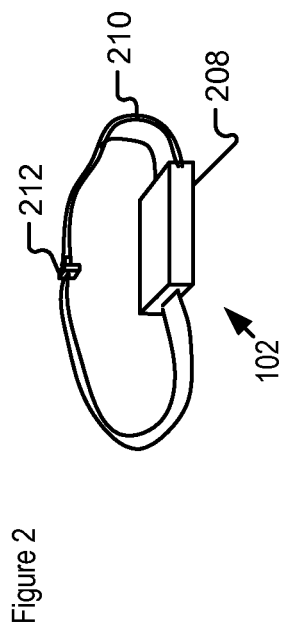
FIG. 2 depicts tetherless leash 102 of system 100 attached to a collar.

As previously described, unlike some prior art wireless fencing systems, input device 1136 is sealed within waterproof housing 208 (FIG. 2). That is, tetherless leash 102 has no exposed switches or buttons as are often used for programming (e.g., establishing a perimeter, etc.). This reduces the exposure of circuitry within the tetherless leash to moisture, thereby extending the useful life of tetherless leash 102. Since input device 1136 cannot be directly accessed to program tetherless leash 102, programming fixture 104 is required. The programming fixture serves as a user interface for programming tetherless leash 102. Programming fixture 104 is described in more detail later in this specification.

Stimulator 1138 is used to issue a warning, which is typically a sound, or to issue a correction, which is typically an electric shock, responsive to commands from processor 1134. Stimulator 1138 is described further below in conjunction with FIG. 12.

Battery 1140 is a rechargeable battery that powers tetherless leash 102 in well-known fashion. The battery delivers power to power control circuitry (not depicted), which distributes power as required to the various powered elements within tetherless leash 102. Battery 1140 can be charged inductively or via electrodes 1244 (see, e.g., FIGS. 12 and 13A) in known fashion.

Motion detector 1142 is used to discriminate an animal's motion. In the illustrative embodiment, motion detector 1142 is a piezoelectric sensor. In some alternative embodiments, other types of motion detectors can be used, such as accelerometers, moving magnet detectors, moving coil detectors, and other types of detectors. It will be clear to those skilled in the art how to select and use a motion detector for motion discrimination in tetherless leash 102.

Figure 12:
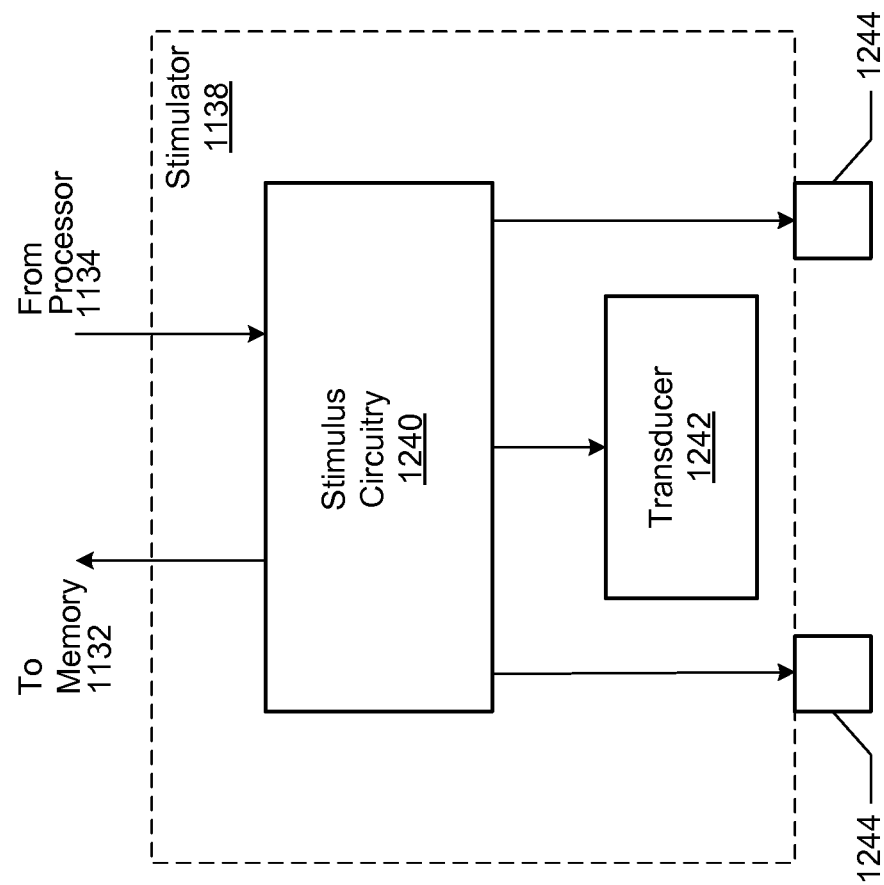
FIG. 12 depicts a block diagram of the salient components of stimulator 1138 of tetherless leash 102.

FIG. 12 depicts a block diagram of the salient components of stimulator 1138. The stimulator comprises: stimulus circuitry 1240, transducer 1242, and electrodes 1244. The stimuli that are generated by stimulator 1138 are suitably unpleasant to an animal to modify its behavior while not causing it any harm. In the illustrative embodiment, stimulator 1138 is capable of generating two types of stimuli: sound and electric shock.

In accordance with the illustrative embodiment, wireless fencing system 100 uses a tiered system of applying stimuli, via stimulator 1138, to a monitored animal. In particular, a "warning" stimulus precedes a correction stimulus, the latter being the more unpleasant of the two. The stimulus progresses from a "warning" to a "correction" as a monitored animal exhibits increasingly undesirable behavior (e.g., continued approach to a perimeter to the extent that breach is imminent, etc.), in accordance with the protocols and methods previously described. In the illustrative embodiment in which stimulator 1138 generates an auditory alert and an electric shock, the auditory alert is the warning and the electric shock is the correction.

In addition to having a capability of delivering different types of stimuli, stimulus circuitry 1240 is capable of varying the severity of the stimuli, as dictated by processor 1134. For example, stimulus circuitry 1240 is capable of varying the pitch, duty cycle, repetition rate, volume, or combinations thereof, of the auditory alert. Likewise, stimulus circuitry 1240 is capable of varying the intensity, repetition rate or duration of an electric shock.

In addition to its capability to warn and correct, stimulator 1138 is also capable of providing a stimulus that is intended as positive reinforcement. In the illustrative embodiment, this "positive" stimulus is auditory. One example of an auditory stimulus that would serve as positive reinforcement for a dog is recorded or synthetic speech that says, in an appropriate tone, "good dog" (assuming that the dog has been previously praised using these words). Recorded speech, stored in memory 1132 of tetherless leash 102, can be an audio clip of the voice of the animal's owner or some other recording to which the animal reacts favorably.

Stimulator 1138 generates the stimulus under the control of processor 1134. Signals from the processor indicate the type and severity of the stimulus or are used to determine these attributes. Based on the signals, stimulator circuitry 1140 actuates either transducer 1242 to generate sound (e.g., audible alert, speech, etc.) or actuates electrodes 1244 to deliver an electric shock.

For example, consider a pre-breach monitoring scenario. In some embodiments, after receiving an estimate of the likelihood of perimeter breach from processor 1134, stimulus circuitry 1240 accesses a look-up table that provides stimulus type and severity as a function of likelihood of perimeter breach. After determining the appropriate stimulus and its severity from the table, a signal indicative thereof is sent to transducer 1242. Based on that signal, transducer 1242 generates an stimulus having the appropriate characteristics. In some other embodiments, processor 1134 can determine the appropriate stimulus and its severity (e.g., via accessing a look-up table, etc.), and provide that information directly to stimulator circuitry 1240.

It will be clear to those skilled in the art how to calculate an appropriate stimulus and the severity thereof, and how to generate it, such as by reproducing speech or tones through transducer 1242 and generating an electric shock of appropriate intensity via electrodes 1244.

Programming Fixture 104

Programming fixture 104 provides three primary functions:
1. It serves as a user interface for programming tetherless leash 102.
2. It protects the programmer from inadvertent shock while handling the tetherless leash.
3. It precludes accidental programming or function changes during normal use.

Figure 13:
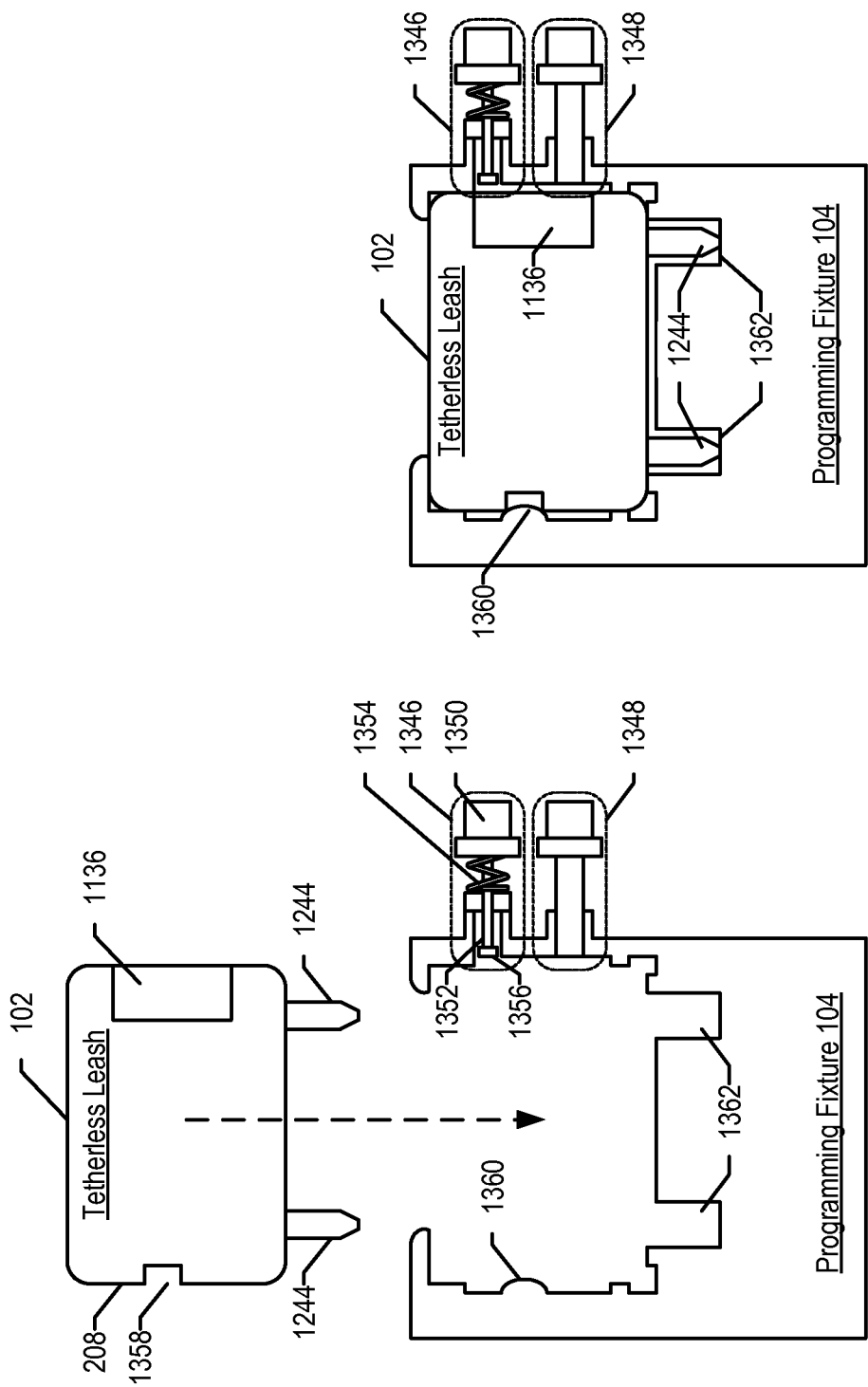
FIG. 13A depicts programming fixture 104 and tetherless leash 102.
FIG. 13B depicts the manner in which programming fixture 104 and tetherless leash 102 engage one another to place the tetherless leash in the programming mode.

These functions are described in more detail below in conjunction with FIGS. 13A and 13B, which depict programming fixture 104 and tetherless leash 102 in the process of physically engaging one another for programming. FIG. 13A depicts these items before they engage, and FIG. 13B depicts them after they engage.

In the illustrative embodiment, programming fixture 104 includes programming buttons 1346 and 1348. For clarity, the internal details of button 1348 are not depicted; in the illustrative embodiment, the buttons are identical. In some alternative embodiments, programming fixture 104 includes only a single button.

In the illustrative embodiment, programming button 1346 comprises cap 1350, plunger 1352, spring 1354, and magnet 1356. When programming button 1346 (or 1348) is depressed by a user, magnet 1356 is moved to within sensing/actuation range of magnetically-responsive input device 1136. As previously described in conjunction with the discussion of programming the tetherless leash, when using a two-button programming fixture, one of the buttons controls the shape of the perimeter of the confinement zone (e.g., circular vs. polygonal, etc.), while the other button is used to obtain a locational fix and store it as a vertex of a polygonal perimeter of a confinement zone or as a geometric center of a circular confinement zone.

In the illustrative embodiment, tetherless leash 102 includes channel 1358 for receiving rib 1360 in programming fixture 104. This "keyed" arrangement ensures that input device 1136 of the tetherless leash and programming buttons 1346 and 1348 of the programming fixture properly align when mated. The illustrative embodiment of programming fixture 104 includes two cavities or recesses 1362 that receive electrodes 1244. The recesses prevent the user from inadvertently contacting electrodes 1244, thereby preventing a shock. Once removed from programming fixture 104, tetherless leash cannot be accidentally reprogrammed since there are no externally accessible switches or contacts.

Terminal 106

Figure 14:
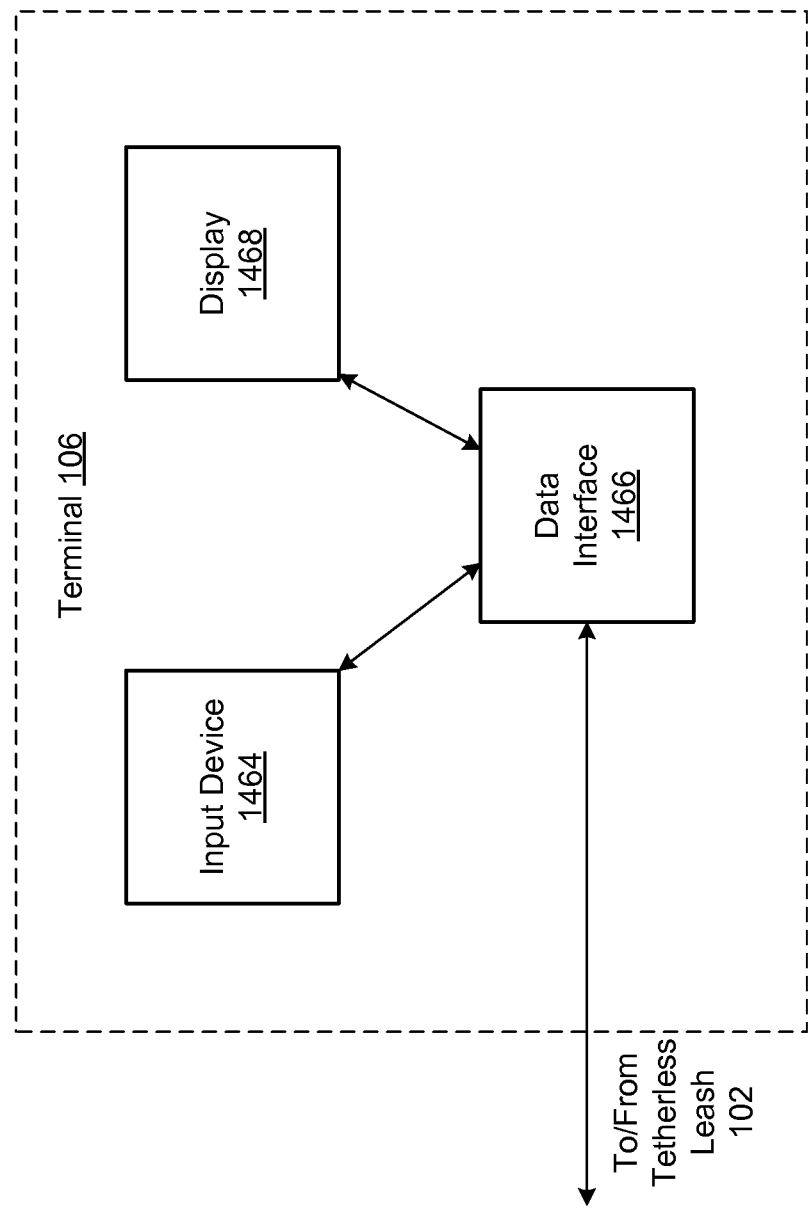
FIG. 14 depicts terminal 106 of wireless fencing system 100 in accordance with the illustrative embodiment of the present invention.

FIG. 14 depicts a block diagram of the salient components of terminal 106 in accordance with the illustrative embodiment of the present invention. Terminal 106 comprises input device 1464, data interface 1466, and display 1468, interrelated as shown.

Terminal 106 is an optional device that serves as a programming aid. It is used, for example, to verify programming. In particular, rather than walking the perimeter (to verify programming) after its been programmed, terminal 106 interrogates tetherless leash 102 and depicts, on display 1468, a graphical representation of the programmed perimeter. Furthermore, in some embodiments, terminal 106 is used as a back-up to store a perimeter that has been programmed into tetherless leash 102.

Tetherless leash 102 interfaces either wirelessly (e.g., via a high-frequency coil, two-way IR sensor, or via transceivers [transceiver 1128 on tetherless leash⇆transceiver as data interface 1466 on terminal 106]), or via suitable wired interface port (e.g., between an input/output port [not depicted] on tetherless leash 102 and wired port as data interface 1466 on terminal 106, etc.)

In the illustrative embodiment, terminal 106 is a personal computer with a suitable wired interface port as data interface 1466 (e.g., USB, parallel port, IEEE RS-232, IEEE 488, etc.) or a wireless interface as data interface 1466 (e.g., blue-tooth, IEEE 802.11, etc.). In the illustrative embodiment, display 1468 is simply the monitor used with the computer and input device 1464 is a keyboard, which can likewise be used to input data such as positional coordinates.

In some alternative embodiments, terminal 106 is a handheld device, such as a personal digital assistant (PDA) or pocket PC with suitable wired interface port or wireless interface. In some embodiments, the handheld device has the capability to download map data to a PC through conventional data transfer methods, such as "hot-synching."

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising a tetherless leash, wherein the tetherless leash comprises a processor, wherein:
   A) the processor determines whether or not the tetherless leash has breached a perimeter;
   B) when the processor determines that the tetherless leash has not breached the perimeter, the processor determines a likelihood of perimeter breach, wherein the likelihood of perimeter breach is not solely a function of the location of the tetherless leash with respect to the perimeter; and
   C) the processor determines whether or not to apply a stimulus via the tetherless leash based on the determined likelihood of perimeter breach.

2. The apparatus of claim 1 wherein the tetherless leash comprises a positioning system receiver, wherein the positioning system receiver receives signals and, from the signals, determines geo-coordinates that correspond to a location of the tetherless leash.

3. The apparatus of claim 2 further comprising a computer-readable memory that is accessible to the processor, wherein after the tetherless leash breaches the perimeter, the processor, in conjunction with the positioning system receiver, obtains and stores in the memory a plurality of waypoints, wherein each waypoint comprises geo-coordinates of a location of the tetherless leash at a different time after the tetherless leash has breached the perimeter.

4. The apparatus of claim 1 wherein the tetherless leash is coupled to an animal and wherein to promote continued desirable movement of the animal, the tetherless leash issues a reward.

5. The apparatus of claim 1 comprising a motion detector, wherein, based on information from the motion detector, the processor is capable of distinguishing different types of movement of the tetherless leash and, as a function of the type of movement, determines whether an update of the location of the tetherless leash is required.

6. The apparatus of claim 1 wherein the tetherless leash comprises:
   a housing having no exposed input devices;
   at least one electrode that extends beyond the housing to deliver a shock to a wearer of the tetherless leash, responsive to the processor, wherein the shock is a first type of the stimulus; and
   a switch for inputting programming commands to the processor, wherein the switch is disposed within the housing and is not accessible by physical contact.

7. The apparatus of claim 6 wherein the switch is magnetically actuated.

8. The apparatus of claim 6 further comprising a programming fixture for actuating the switch, wherein the programming fixture is physically distinct from the tetherless leash, and wherein the programming fixture comprises:
   a body that is structurally configured to physically engage and couple to the housing of the tetherless leash to actuate the switch, wherein the body includes a recess for receiving the least one electrode and for physically shielding the electrode from contact by a user that is using the programming fixture to actuate the switch; and
   a programming button for actuating the switch, wherein the programming button is attached to the body, and wherein when the programming fixture is coupled to the housing, the programming button is within actuation range of the switch.

9. The apparatus of claim 1 wherein the processor further determines whether or not the tetherless leash, while within the perimeter, is in a region that is less than a first distance to the perimeter, wherein:
   the region defines a stimulus zone;
   the tetherless leash delivers a stimulus whenever the tetherless leash is within the stimulus zone; and
   a severity of the stimulus is a function of the likelihood of perimeter breach.

10. The apparatus of claim 1 wherein the processor determines the severity of any stimulus applied based on the determined likelihood of breach, wherein the more likely the perimeter breach, the more severe the applied stimulus.

11. The apparatus of claim 1 wherein when the processor determines that the tetherless leash has breached the perimeter, the tetherless leash issues a response, but the response does not include expanding the perimeter.

12. The apparatus of claim 1, wherein the likelihood of perimeter breach is based on:
   (i) the distance of the tetherless leash to the perimeter;
   (ii) the direction that the tetherless leash is heading with respect to the perimeter; and
   (iii) the speed at which the tetherless leash is moving.

13. An apparatus comprising a tetherless leash, wherein said tetherless leash comprises:
   a positioning system receiver for determining a pair of geo-coordinates that correspond to a location of the tetherless leash;
   a processor for defining a perimeter based on at least the pair of geo-coordinates;
   a magnetically-actuated switch for causing the processor, in conjunction with the positioning system receiver, to obtain the plurality of pairs of geo-coordinates and define the perimeter, wherein the magnetically-actuated switch is disposed within a housing and is not physically accessible;
   at least one electrode that extends beyond the housing to deliver a first type of stimulus to a wearer of the tetherless leash; and
   a programming fixture for magnetically-actuating the switch, wherein the programming fixture includes:
   (i) a body that is structurally configured to physically engage and couple to the housing of the tetherless leash to actuate the switch, wherein the body includes a recess for receiving the least one electrode and for physically shielding the electrode from contact by a user that is using the programming fixture to actuate the switch; and (ii) a programming button for magnetically-actuating the switch, wherein the programming button is attached to the body, and wherein when the programming fixture is coupled to the housing, the programming button is within actuation range of the switch.

14. The apparatus of claim 13 wherein, during a monitoring operation, the processor:
receives updates over time as to a location and a vector of movement of the tetherless leash;
compares the updated location and vector of movement to the perimeter; and
causes the tetherless leash to issue a response when the tetherless leash breaches the perimeter, wherein the response excludes expanding the perimeter.

15. The apparatus of claim 14 wherein the tetherless leash comprises a motion detector for detecting movement of the tetherless leash, and wherein the processor, based on information from the motion detector, distinguishes between locomotion and other types of motion, and further wherein the processor causes the positioning system receiver to obtain an update of the position of the tetherless leash only when the motion is locomotion.

16. The apparatus of claim 13 comprising a terminal, wherein the terminal comprises a display, and wherein the perimeter that is defined by the processor is displayed on the display.

17. The apparatus of claim 13 wherein:
the processor receives updates over time as to the location of the tetherless leash;
the processor determines whether or not the tetherless leash has breached the perimeter;
when breach has not occurred, the processor determines a likelihood of perimeter breach.

18. The apparatus of claim 17 wherein the processor determines:
(i) whether or not to apply a stimulus, including the first type of stimulus, via the tetherless leash, based on the determined likelihood of perimeter breach; and
(ii) the severity of the stimulus, if applied, based on the determined likelihood of perimeter breach, wherein the greater the determined likelihood, the greater the severity of the stimulus.

19. The apparatus of claim 17 wherein the likelihood of perimeter breach is based on:
(i) the distance of the tetherless leash to the perimeter;
(ii) the direction that the tetherless leash is heading with respect to the perimeter; and
(iii) the speed at which the tetherless leash is moving.

* * * * *